United States Patent [19]

Marini et al.

[11] Patent Number: 5,119,100

[45] Date of Patent: Jun. 2, 1992

[54] DEVICE FOR IMPROVING RADAR RESOLUTION

[75] Inventors: Stefano Marini, Rome; Francesco Prodi, Pisa, both of Italy

[73] Assignee: Selenia Industrie Elettroniche Associates, S.p.A., Rome, Italy

[21] Appl. No.: 672,731

[22] Filed: Mar. 21, 1991

Related U.S. Application Data

[63] Continuation of Ser. No. 511,626, Apr. 20, 1990, abandoned.

[30] Foreign Application Priority Data

Apr. 21, 1989 [IT] Italy ............... 47873A/89

[51] Int. Cl.⁵ .................. G01S 7/28; G01S 13/50
[52] U.S. Cl. ...................... 342/195; 342/25; 342/196; 342/161
[58] Field of Search ........... 342/25, 195, 196, 161

[56] References Cited

U.S. PATENT DOCUMENTS

| | | | |
|---|---|---|---|
| H741 | 2/1990 | Powell et al. | 342/25 |
| 4,450,444 | 5/1984 | Wehner et al. | 342/25 |
| 4,471,357 | 9/1984 | Wu et al. | 342/25 |
| 4,527,161 | 7/1985 | Wehner | 342/152 |
| 4,546,355 | 10/1985 | Boles | 342/179 |
| 4,562,439 | 12/1985 | Peralta et al. | 342/81 |
| 4,617,567 | 10/1986 | Chan | 342/25 |
| 4,758,838 | 7/1988 | Maeda et al. | 342/25 |
| 4,768,156 | 8/1988 | Whitehouse et al. | 364/521 |
| 4,786,906 | 11/1988 | Krogager | 342/25 |
| 4,851,848 | 7/1989 | Wehner | 342/25 |
| 4,855,747 | 8/1989 | Steinberg | 342/179 |
| 4,872,012 | 10/1989 | Chabries | 342/25 |
| 4,924,229 | 5/1990 | Eichel et al. | 342/25 |

Primary Examiner—John B. Sotomayor
Attorney, Agent, or Firm—Cohen, Pontani, Lieberman

[57] ABSTRACT

A device for processing radar signals has the capability of obtaining single or multiple target information as well as target length by utilizing relative radar-target movement. The device includes a radar receiver; an Inverse Synthetic Aperture Radar processor; a list sensor for supplying listing data to the Inverse Synthetic Aperture Radar (ISAR); an element for determining the presence of one or more targets as well as target length; a radar tracking loop for estimating parameters of target motion; and a display unit for displaying the processed information.

5 Claims, 3 Drawing Sheets

DEVICE FOR IMPROVING RADAR RESOLUTION

This is a continuation of U.S. application Ser. No. 07/511,626, filed Apr. 20, 1990 now abandoned.

FIELD OF THE INVENTION

The present invention relates to a device for processing radar signals, preferably in a pursuit or tracking radar system. The device uses Inverse Synthetic Aperture Radar (ISAR) signal processing techniques to improve the quality of information gained from received radar signals. Specifically, the invention is capable of discriminating between multiple targets as well as determining target length from ISAR processed target profile information.

BACKGROUND OF THE INVENTION

ISAR processing techniques are known in the radar art for improving the resolution of radar images. The ISAR techniques make use of the motion of the target itself to generate a synthetic antenna having an operative length equal to the distance travelled by the target during the radar observation period. In performing signal processing operations on the received radar signals when using the ISAR technique on a moving platform, such as a ship at sea, compensation must be provided for the motion of the platform itself relative to the motion of the target. While there exists in the art currently systems which provide motion compensation in ISAR systems for use on moving platforms, such systems are commonly used for ordinance control. While such known ISAR techniques can provide target imaging, such systems cannot detect the presence of nor discriminate between multiple targets present within the tracking area being scanned by the radar system.

The present system not only provides improved imaging but the ability to discriminate between single and multiple targets using an ISAR processing technique.

OBJECTS AND SUMMARY OF THE INVENTION

The present invention relates to a device for processing radar signals, specifically in a pursuit or tracking radar system.

The invention provides a system which can detect the presence of and discriminate between single or multiple targets as well as calculate target length by utilizing relative radar-target movement data.

The device of the invention is believed best applied downstream of an A/D converter of a pursuit or tracking radar, and its purpose is improving the transverse resolution capability of the system. For this purpose, the Inverse Synthetic Aperture Radar (ISAR) technique can be employed, which makes it possible to generate a synthetic antenna of a length equal to the space passed over by the target during the observation period.

For each pulse transmitted, the radar echo pulse return signals' in-phase and quadrature components are memorized or stored, so as to maintain the pulse return phase information. The sequence of the echo signals coincides with that which would be received by a mobile antenna that would occupy the successive positions of the object, in such a manner as to have the same relative geometry.

The fundamental process of the ISAR technique consists of compensating for the relative movement between the radar antenna and the target. This motion is given by the composition of the absolute movements of the target and of the antenna; the latter assuming particular importance in naval applications due to the possible listing of the platform. "Listing" is a common naval term used to describe the tilting or canting motion of the ship induced by the wave motion of the ocean.

The invention concerns an application of the ISAR technique to tracking radar, whether land or naval, for recognition of the presence of single or multiple targets, as well as for an estimation of the length of the target itself as deduced from its radar profile. While the device described finds what is believed its best application in a tracking radar system, this does not preclude the device being applied to other types of radar.

More specifically, the inventive device may be inserted downstream of the analog-digital converter of a radar, particularly in a tracking radar. It is formed essentially of a circuit which, for each pulse transmitted, stores the in-phase and quadrature components of the sum channel of the radar which correspond to a certain observation time interval. With the synchronism or timing established by a suitable timing circuit, the values of the pulse repetition period, the transmitted frequency, and the range (slant distance) of the target are stored.

The data stored are processed in accordance with ISAR techniques. This processing consists of motion compensation followed by transverse compression. An automatic system then determines the presence of a single or multiple target. The length of the target is then determined by combining the compressed data and the data on the trajectory (range, azimuth and elevation) which are supplied by the tracking loop of the radar. Tracking loops, also known as "gates" or "bins" are typically used to maintain tracking parameters used by the system. The information obtained and processed as to the presence of a single target or multiple targets, target length and, in particular, the profile of the transverse (cross range) reflectivity of the target with respect to the combined radar-target data, are finally determined by a suitable processor or decider. This data is then displayed on a visual display unit.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWING

The invention will now be described, by way of illustration and not of limitation, with reference to the accompanying drawing, in which.

DETAILED DESCRIPTION OF THE PREFERRED EMBODIMENTS

Figure 1:
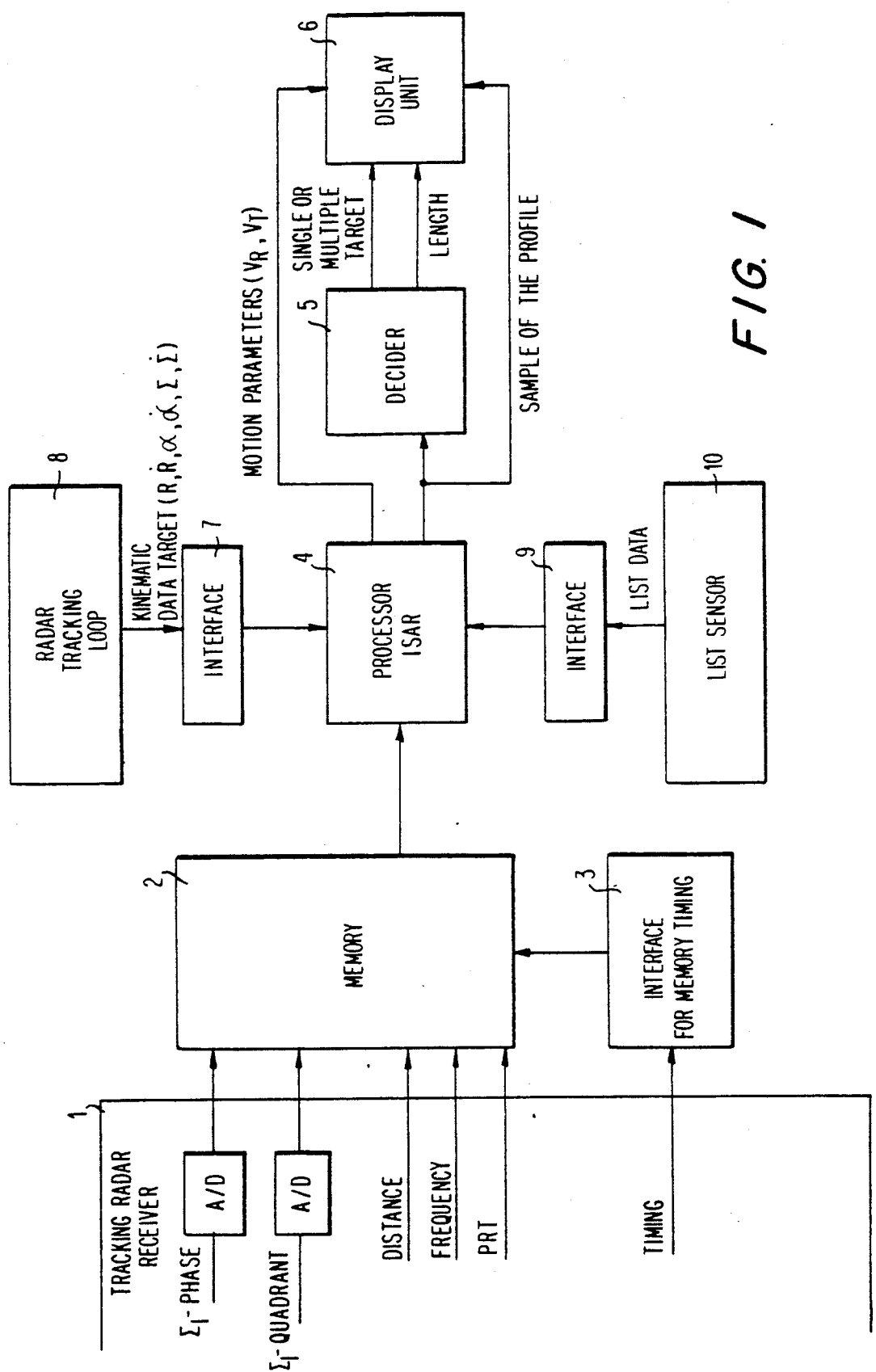
FIG. 1 is a block diagram of a device forming the object of the present invention and its utilization in a tracking radar.

The inventive device, as depicted in FIG. 1, comprises a radar receiver 1; a memory circuit 2; an interface 3 for memory timing; an ISAR processor 4; an interface 7 with the tracking loops of the radar 8; an interface 9 with a list sensor 10; a decision element 5; and a display unit 6. The inventive device receives, at an input, data representing the in-phase and quadrature components of the sum channel of the radar receiver 1. For each period of repetition of the pulses—known as the pulse repetition time (PRT)—a complex sample is stored in memory 2, together with the data on the range, frequency and period of repetition coming from the receiver 1. The qualifying for the recording of the memory 2 is supplied by the interface 3 which, in turn, receives at the input a "trigger" signal corresponding to the range of the target. The data stored in the memory 2 and corresponding to a given period of observation are then processed by the ISAR processor 4. This processor processes information relative to the degree of listing—that is the movement of the platform—coming from the list sensor 10 via the interface 9. From the tracking "loop" of the radar 8, it receives the estimate of the parameters of target motion through interface 7. This kinematic data is made up of the three position components (range, azimuth and elevation) and their derivatives with respect to time. The tracking loop 8 represents the range, azimuth and elevation gates or bins commonly found in tracking radar. The tracking loop is used to maintain the radar antenna correctly positionally located to maintain continuous acquisition of target information during the observation period. The gating parameters in tracking radar are adaptable based on operation parameters and application criticality.

The ISAR processor 4 generates at its output the samples of the transverse or cross range resolution profile of the target. The processor also gives, in parallel to this, accurate estimates of the radial and transverse (tangential) components of the velocity of the target.

The samples of the cross range radar resolution profile are sent to another processor known as a decider 5, which determines whether the target image represents a single target or multiple targets, and additionally computes target length, from the cross range resolution image data provided by ISAR processor 4. The accurate estimate of the radial and tangential components of velocity, the samples of the cross range resolution profile, the single or multiple target information, and the target length are displayed on a suitable display unit 6.

Figure 2:
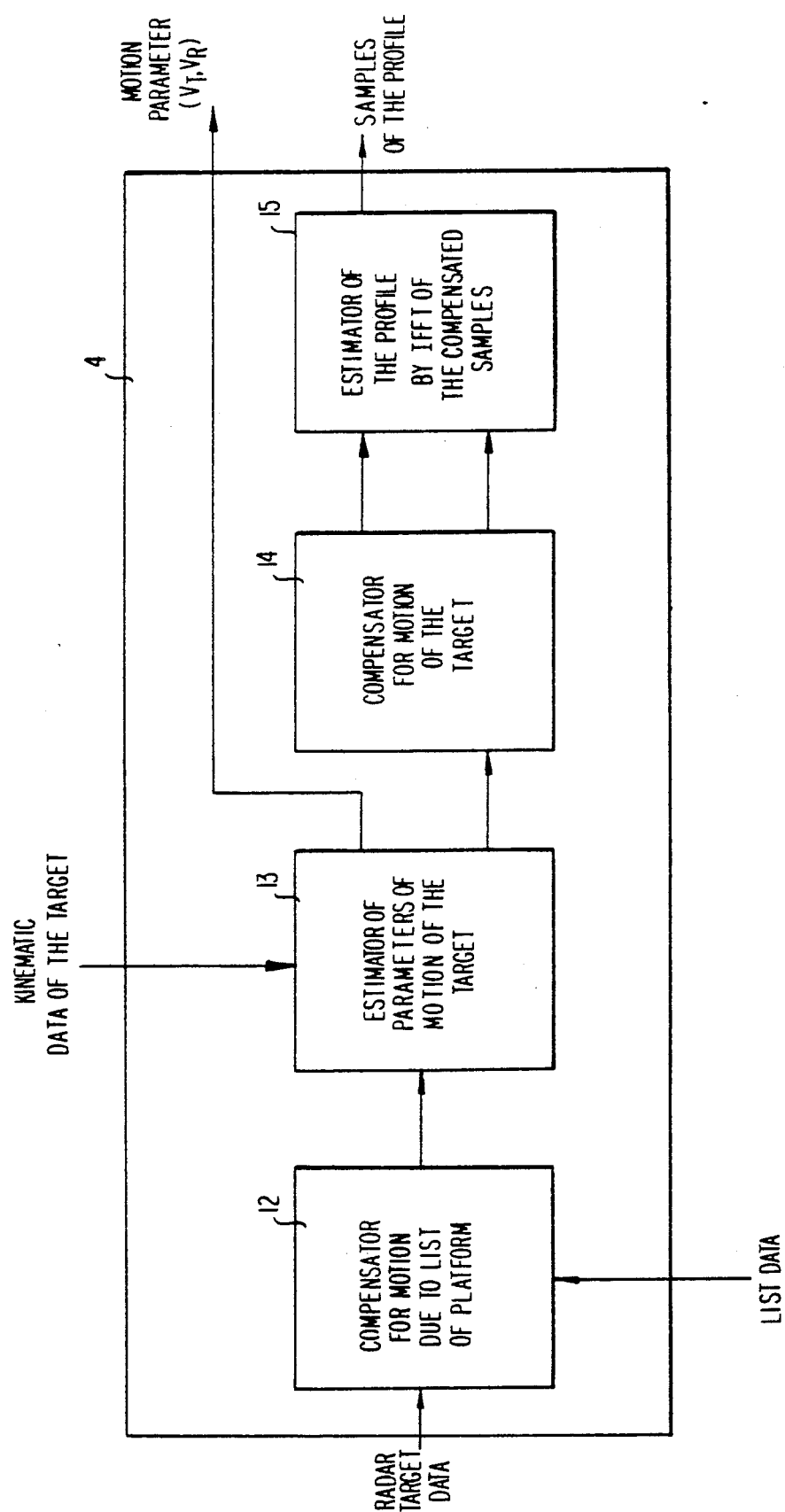
FIG. 2 shows a block diagram detailing the structure of the ISAR processor of FIG. (block 4) and its essential components.

FIG. 2 is a diagram of the ISAR processor 4 in greater detail. FIG. 2 shows a compensator 12 for motion due to the listing of the platform; an estimator 13 of parameters of the motion of the target; a compensator 14 of the movement of the target; an estimator 15 of the cross range resolution profile by IFFT of the compensated samples; list data d; and samples of the profile c. In FIG. 2, the fundamental process occurring in the ISAR processor 4 comprises compensating for the motion of the target, which consists of subtracting from the phase of the signal stored in the memory 2 the phase relative to a reference point on the target. The radar data is initially compensated for by the component of the relative radar-target motion induced by the list of the platform. This function is carried out by the block 12. Of course, this block is excluded in radar applications on stationary platforms of the land radar type.

The variation of the phase of the reference point, in the event of uniform linear motion, is parameterized with a polynomial of the second degree, the coefficients of which are estimated by the estimator 13. These coefficients depend on the parameters of the motion of the reference point and are the average radar-target range and the radial and tangential components of velocity. This phase is subtracted from the phase of the recorded samples by the block 14, which samples have been already compensated in block 12 by the phase due to the list. In this way, the samples thus obtained are compensated for the motion of the target relative to the radar.

The compensating of the motion effected by the block 14 also utilizes the geometrical-kinematic data supplied by the control loop of the tracking radar in order to resolve possible ambiguities of the radial velocity and to make the estimate of the parameters of the motion more efficient.

The profile of the target is reconstructed by the block 15 as the IFFT (Inverse Fast Fourier Transform) of the compensated samples.

Figure 3:
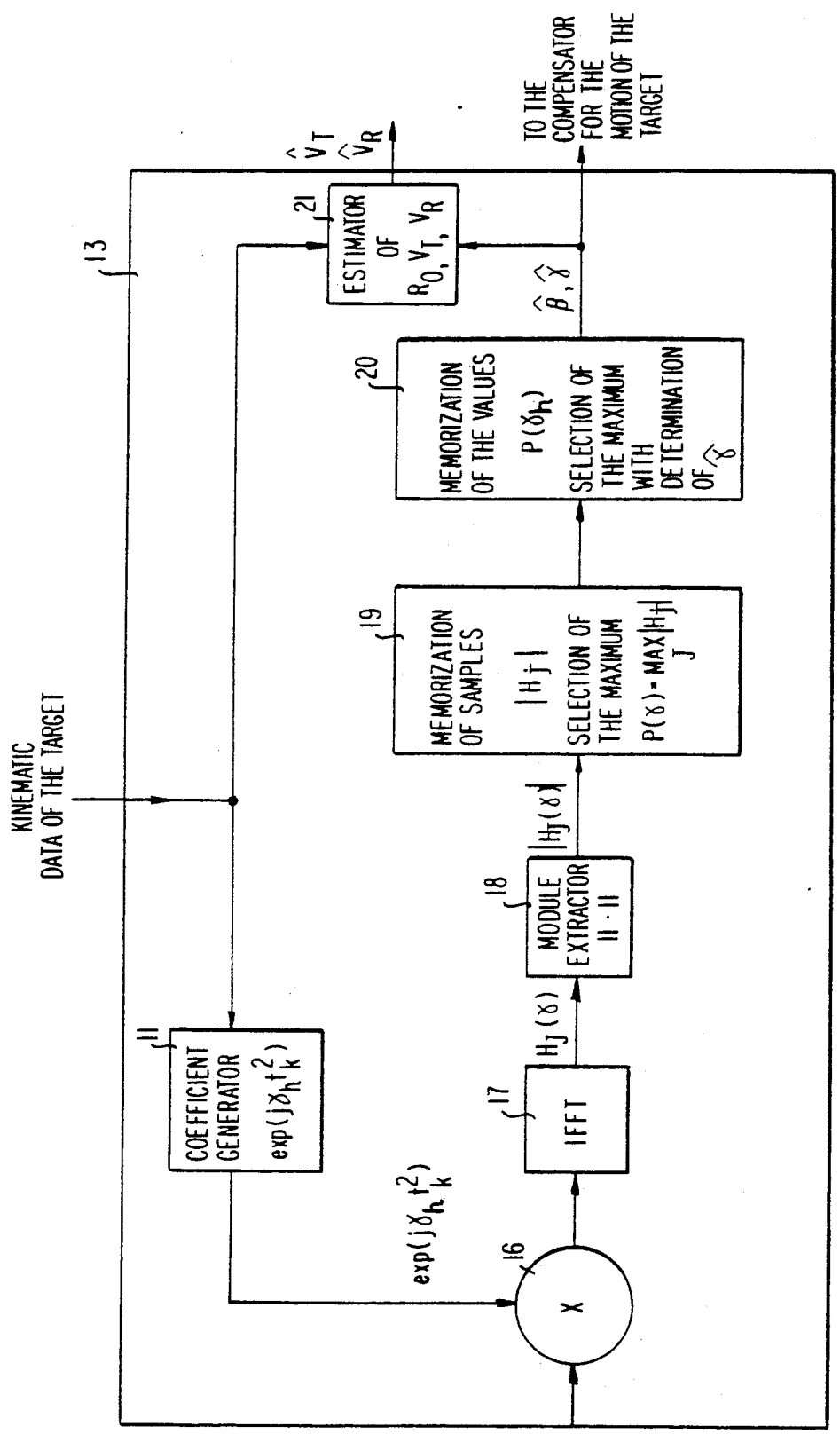
FIG. 3 shows a block diagram detailing the structure of the estimator of the parameters of target motion of FIG. 2 (block 13).

The details of the estimator 13 of the parameters of the motion of the target ar set forth in FIG. 3. Such figures show a coefficient generator 11; a complex multiplier 16; an IFFT element 17; a module extractor 18; an element 19 for memorization (storage) of the samples and selection of the maximum; an element 20 for memorization (storage) of the values and selection of the maximum; an estimator 21 of range Ro, velocity components Vt, Vr; kinematic data of the target; and connection to the target motion compensator.

The input to block 13 is formed by the sequence of the data recorded and already compensated for the listing of the platform. These data are compensated several times with a time phase term $\exp(j\beta_i t_k + \gamma_h t_k^2)$ in which $t_k$ represents the sequence of the moments of sampling of the signal and $\beta_i$ and $\gamma_h$ are the coefficients respectively of the polynomial which parameterizes the phase of the reference point.

Initially, the input data are compensated for the quadratic term phase $\exp(j\gamma_h t_k^2)$ generated in the block 11 by the multiplier 16. Thereupon the data thus compensated are further compensated by the linear phase term $\exp(j\beta_i t_k)$. This latter compensation is effected in efficient manner as IFFT by the block 17. This block also effects the coherent sum of the compensated samples. From the samples $H_j(\gamma)$ the modulus is extracted by the block 18. The block 19 effects the selection of the maximum value of such modulus for each value $\gamma_h$. This maximum value $P(\gamma_h)$ is transferred to the block 20 and stored in it. These operations are repeated for the $\gamma_h$ values so as to cover the variability interval. The estimate $\hat{\gamma}_h$ is then caused to coincide with the value $\gamma_h$ which makes $P(\gamma_h)$ maximum. The block 21 receives at its input the estimates $\hat{\beta}, \hat{\gamma}$ determined by the processing just described, the range estimates Ro, and velocity components $V_t$ and $V_R$ supplied by the control loop of the tracking radar. These quantities are used to determine accurate values of the radial and transverse speed of the target to be sent to the decider 5 to be utilized by the deciders 5 in its calculations of target length and quantity of targets.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, however, therefore, to be limited only as indicated by the scope of the claims appended hereto.

What is claimed is:

1. A device for processing radar signals for improved target discrimination and resolution when the radar is mounted on a platform which may be moving and which target may be moving relative to the radar comprises:

an Inverse Synthetic Aperture Radar (ISAR) processor;

means for receiving radar signals reflected from a target, said signal receiving means having an output for outputting radar target data samples related to said reflected radar signals to said ISAR processor;

means for detecting motion of the platform on which the radar is mounted, said platform motion detecting means outputting to said ISAR processor platform motion data related to said platform motion;

a radar tracking loop connected to said ISAR processor for providing kinematic target data to said ISAR processor;

said ISAR processor processing the radar target data samples, the platform motion data and the kinematic target data and outputting processed data resulting from said processing, said processed data comprising an ISAR projected high resolution image profile of the target, an estimated value of the radial velocity of the target, and an estimated value of the tangential velocity of the target, each of said estimated values and said image being corrected by said ISAR processor to compensate for the motion of the platform and the motion of the target relative to the radar;

means for determining target characteristics from said ISAR projected high resolution image profile of the target, said target characteristic determining means determining whether the reflected radar signals are from a single target or from multiple targets and for determining a length of the target from said image profile, said determining means outputting target characteristic data relating to the presence of single or multiple targets and target length data relating to target length; and means for visually displaying data, said visual display means visually displaying the processed data from said ISAR processor, said target characteristic data and said target length data for visual observation and interpretation.

2. The device according to claim 1, wherein said ISAR processor comprises, in series:

means for compensating for the motion of the platform detected by said motion detecting means, said platform motion compensating means subtracting said platform motion from said radar target data samples so that said radar target data samples remain undistorted by said platform motion;

means for estimating target motion parameters based upon said kinematic target data supplied from said radar tracking loop and said radar target data samples which have been compensated by said platform motion compensating means so as to provide an estimate of target range, an estimated radial velocity of the target and an estimated tangential velocity of the target;

means for compensating for the motion of the target relative to the radar based upon the estimate of target range and the radial and tangential velocity estimates from said target motion parameter estimating means, said target motion compensating means subtracting the target motion from said radar target data samples so that said radar target data samples remain undistorted by target motion relative to the radar; and means for forming an ISAR high resolution target profile image, said ISAR high resolution target profile image being formed by Inverse Fast Fourier Transformation of said radar target data samples after said radar target data samples have been serially processed by said platform motion compensating means, said target motion parameter estimating means and said target motion compensating means.

3. The apparatus according to claim 1, wherein said target motion parameter estimating means comprises, in series:

means for multiplying said radar target data samples by a quadratic phase correction exponent, said multiplying means receiving said radar target data samples to be multiplied from said platform motion compensating means and outputting multiplied radar target data samples;

means for linear phase correction of said multiplied radar target data samples by Inverse Fast Fourier Transform of said multiplied radar target data samples, said linear phase correction means outputting linear phase corrected target data samples;

means for computing a modulus of said linear phase corrected target data samples, said modulus computing means outputting a target data sample modulus;

means for selecting a maximum value of said target data sample modulus;

means for storing said target data sample modulus and said maximum value of said target data sample modulus;

means for extracting a target data sample modulus from said storage means, said extracted target data sample modulus being that modulus which results in the highest maximum value being obtained from said maximum value selection means during a variability interval, said extracting means outputting said extracted target data sample modulus to said target motion compensation means; and means for determining an estimate of target motion based upon the target data sample modulus extracted by said extracting means and the kinematic target data from said radar tracking loop, said determining means outputting an estimate of target range, an estimated radial velocity of the target and an estimated tangential velocity of the target.

4. The device according to claim 3, wherein said target motion parameter estimating means further comprises means for generating a coefficient, said coefficient generating means generating said quadratic phase correction exponent.

5. The apparatus according to claim 1, wherein said target characteristic determining means determines whether the reflected radar signals are from a single target or from multiple targets by determining differences in the movement of the target relative to the radar based upon said ISAR projected high resolution image profile, such that a difference in the movement of said high resolution image profile denotes the presence of more than one target.

* * * * *